United States Patent [19]
Goto et al.

[11] Patent Number: 5,580,363
[45] Date of Patent: Dec. 3, 1996

[54] METHOD FOR DETECTING A DEFECT IN A GLASS-CERAMIC FOR MAGNETIC DISKS

[75] Inventors: Naoyuki Goto; Katsuhiko Yamaguchi; Yasuyuki Kawashima, all of Sagamihara, Japan

[73] Assignee: Kabushiki Kaisya Ohara, Japan

[21] Appl. No.: 296,369

[22] Filed: Aug. 25, 1994

[30] Foreign Application Priority Data

Dec. 9, 1993 [JP] Japan .................................. 5-309306

[51] Int. Cl.$^6$ .................................. C03B 5/26
[52] U.S. Cl. .................. 65/29.18; 65/33.1; 65/33.8; 501/4; 356/237
[58] Field of Search .................. 65/33.1, 33.8, 65/29.18; 501/4, 5, 6, 69; 356/51, 405, 237, 239

[56] References Cited

U.S. PATENT DOCUMENTS

| | | | |
|---|---|---|---|
| 2,660,565 | 11/1953 | McKeag | 65/33.8 X |
| 2,920,971 | 1/1960 | Stookey | 65/33.8 X |
| 2,971,853 | 2/1961 | Stookey | 65/33.8 X |
| 3,006,775 | 10/1961 | Chen | 65/33.8 X |
| 3,170,805 | 2/1965 | McMillan et al. | 65/33.8 X |
| 3,238,085 | 3/1966 | Hayami et al. | 65/33.8 X |
| 3,804,608 | 4/1974 | Gaskell et al. | 65/33.8 |
| 4,501,492 | 2/1985 | Douklias | 356/73.1 |
| 4,541,856 | 9/1985 | Maillard et al. | 65/29.18 |
| 5,219,799 | 6/1993 | Beall et al. | 501/5 |
| 5,391,522 | 2/1995 | Goto et al. | 501/4 |

FOREIGN PATENT DOCUMENTS 0154694 4/1982 Germany .
50-94016 7/1975 Japan .

OTHER PUBLICATIONS

Physical Properties Committee, "The Assessment of heterogeneity in glass," *Glass Technology*, vol. 2, No. 5, pp. 192–197, Oct. 1961.

*Primary Examiner*—Donald E. Czaja
*Assistant Examiner*—Sean Vincent
*Attorney, Agent, or Firm*—Hedman, Gibson & Costigan, P.C.

[57] ABSTRACT

A method for detecting a defect in a glass-ceramic for magnetic disks includes steps of forming a colored glass-ceramic having Munsell value within the range of 0 to 7 in the CIE color system by subjecting to heat treatment a base glass comprising in weight percent:

| | |
|---|---|
| $SiO_2$ | 65–83% |
| $Li_2O$ | 8–13% |
| $K_2O$ | 0–7% |
| $MgO + ZnO + PbO$ | 0.5–5.5% |
| in which MgO | 0.5–5.5% |
| ZnO | 0–5% |
| PbO | 0–5% |
| $P_2O_5$ | 1–4% |
| $Al_2O_3$ | 0–7% |
| $As_2O_3 + Sb_2O_3$ | 0–2% |
| a coloring agent of at least one ingredient selected from the group consisting of metal oxides of V, Cu, Mn, Cr, Co, Mo, Ni, Fe, Te, Ce, Pr, Nd and Er | 0.5–5% | and checking the glass-ceramic visually or by means of an automatic checking device for detecting a defect in the glass-ceramic.

4 Claims, No Drawings

METHOD FOR DETECTING A DEFECT IN A GLASS-CERAMIC FOR MAGNETIC DISKS

BACKGROUND OF THE INVENTION

This invention relates to a method for detecting a defect in a glass-ceramic for magnetic disks used as recording media in computers.

There has been a rapid progress in developments in magnetic disk for which demand has recently increased remarkably as external media of large scale computers and personal computers.

Aluminum alloy has been conventionally used as a material of magnetic disk substrate. The aluminum alloy substrate, however, tends to produce a substrate surface having projections or spot-like projections and depressions during the polishing process due to defects inherent in the material. As a result, the aluminum alloy substrate is not sufficient in flatness and surface roughness and cannot cope with the recent requirement for high density recording necessitated by increase in the amount of information.

Since a glass-ceramic can be formed to a fine structure containing constituent crystal grains having diameters ranging from 0.02 to 20 μm, it is superior to aluminum alloys in flatness and surface roughness and therefore is more suited to the high density recording. For this reason, magnetic disk substrates made of a glass-ceramic have been proposed and offered on the market.

In a case where a magnetic disk substrate is formed with a glass-ceramic, defects such as a flaw, crack, break and pin hole, if existing in the glass-ceramic, will adversely affect the properties of the magnetic disk produced, sometimes making the magnetic disk unusable depending upon the magnitude of the defects. In manufacturing the prior art glass-ceramics for magnetic disk substrates, therefore, the surface of the glass-ceramics produced is visually checked for finding out such defects.

It is, however, difficult to find out such defects by a visual checking in the prior art glass-ceramics which are transparent or opaque and this visual checking imposes a heavy burden on a person who visually checks the glass-ceramic products and sometimes causes an error in checking. There is an automatic checking method available for checking glass products by using laser beam but, in the case of the glass-ceramics, the difficulty in finding out defects in the glass-ceramics remains unsolved even by using the automatic checking method. Therefore, this difficulty in checking defects in glass-ceramic products poses a serious problem in the quality management of glass-ceramic products.

It is, therefore, an object of the invention to provide a method for detecting a defect in a glass-ceramic for magnetic disks which enables defects on the surface of the glass-ceramic to be detected easily.

SUMMARY OF THE INVENTION

Accumulated studies and experiments made by the inventors of the present invention for achieving the above described object of the invention have resulted in the finding, which has led to the present invention, that defects on the surface of a glass-ceramic can be easily detected by distinguishing such defects optically from a normal portion of the glass-ceramic.

More specifically, in a glass-ceramic which is transparent or opaque and hence is of a high lightness, a significant difference in reflected or diffused light from the surface of the glass-ceramic is hardly produced and this results in the difficulty in detecting the defects. Accordingly, in the present invention, lightness of the glass-ceramic is set within a predetermined range so that a clear difference will be produced in reflected or diffused light from the surface of the glass-ceramic between a defect on the surface and a normal (i.e., good) portion of the surface of the glass-ceramic and thereby the defect can be detected easily.

For achieving the above descreibed object of the invention, a method for detecting a defect in a glass-ceramic for magnetic disks comprises steps of forming a colored glass-ceramic having Munsell value within the range of 0 to 7 in the CIE color system by subjecting to heat treatment a base glass comprising in weight percent:

| | |
|---|---|
| $SiO_2$ | 65–83% |
| $Li_2O$ | 8–13% |
| $K_2O$ | 0–7% |
| $Mgo + ZnO + PbO$ | 0.5–5.5% |
| in which | |
| $MgO$ | 0.5–5.5% |
| $ZnO$ | 0–5% |
| $PbO$ | 0–5% |
| $P_2O_5$ | 1–4% |
| $Al_2O_3$ | 0–7% |
| $As_2O_3 + Sb_2O_3$ | 0–2% |
| a coloring agent of at least one ingredient selected from the group consisting of metal oxides of V, Cu, Mn, Cr, Co, Mo, Ni, Fe, Te, Ce, Pr, Nd and Er | 0.5–5% | and checking the glass-ceramic visually or by means of an automatic checking device for detecting a defect in the glass-ceramic. In one aspect of the invention, the glass-ceramic contains lithium disilicate ($Li_2O.2SiO_2$) and alpha-quartz ($SiO_2$) as a main crystal phase.

When the intensity of reflected light from a normal portion is designated by Ra and the intensity thereof from a defect on the surface by Rb, it becomes easier to detect the defect as Rb becomes larger than Ra. In other words, it becomes easier to detect the defect as the color of the glass-ceramic becomes nearer to black because Ra becomes smaller. In the Munsell value, lightness is assessed in ten stages and the value of the Munsell value approaches 10 as lightness increases and approaches zero as lightness descreases. According to the invention, the Munsell value is set within the range of 0 to 7. If the Munsell value exceeds 7, lightness of the glass-ceramic is too high to detect a defect on the surface easily.

According to the invention, by this arrangement, a clear difference in reflected or diffused light is produced between a defect on the surface of the glass-ceramic and a normal surface portion of the glass-ceramic whereby the defect can be detected very easily.

A visual checking for a defect in the glass-ceramic therefore becomes very easy and the burden on a person who checks the glass-ceramic is reduced and an error in checking can be prevented. Moreover, it becomes possible to detect a defect on the surface by an automatic checking device using laser beam so that automatization of checking of defects can be realized.

In detecting a defect, it is desirable for the color of the glass-ceramic to be a complementary color of a color of light used for detecting a defect. When, for example, the color of the glass-ceramic is Y (yellow), M (magenta) or C (cyan), it is desirable that the color of the light used for detecting a defect should be B (blue), G (green) or R (red).

For setting the color of the glass-ceramic to the Munsell value within the range of 0 to 7, some ion ingredient may be added to coxist with other ingredients of the glass-ceramic, i.e., some coloring agent may be added, to impart a color to the glass-ceramic.

For this purpose, the glass-ceramic having the above described Munsell value comprises, as a coloring agent, 0.5–5 weight percent of at least one ingredient selected from the group consisting of metal oxides of V, Cu, Mn, Cr, Co, Mo, Ni, Fe, Te, Ce, Pt, Nd and Er. As the metal oxides, preferable ones are $V_2O_5$, CuO, $MnO_2$, $Cr_2O_3$, CoO, $MoO_3$, NiO, $Fe_2O_3$, $TeO_2$, $CeO_2$, $Pr_2O_3$, $Nd_2O_3$, $Er_2O_3$.

The content of the metal oxide or metal oxides is limited to the range of 0.5–5 weight percent because, if it is below 0.5%, a color of a desired lightness cannot be imparted to the glass-ceramic whereas if it exceeds 5%, the property such as strength of the material is deteriorated. When a single type of the coloring agent is used, the coloring agent exhibits a color which is peculiar to the ion constituting the coloring agent but when more types of coloring agents are mixedly used, the color produced becomes nearer to black.

According to the invention, the color of the glass-ceramic can be set accurately to the Munsell lightness within the range of 0 to 7.

The glass-ceramic used in the method according to the invention is a glass-ceramic of the $SiO_2$—$Li_2O$—RO system (where RO represents MgO, ZnO or PbO) obtained by subjecting to heat treatment a base glass containing a MgO ingredient as an essential ingredient. This glass-ceramic has, as a crystal phase, alpha-quartz ($SiO_2$) whose grown crystal grain (secondary grain) has a globular grain structure and has excellent surface characterisitcs of a polished surface by controlling the size of the crystal grain.

This glass-ceramic which has the above described coloring agent comprises, as other ingredients of the $SiO_2$—$Li_2O$—RO system glass-ceramic, in weight percent:

| | |
|---|---|
| $SiO_2$ | 65–83% |
| $Li_2O$ | 8–13% |
| $K_2O$ | 0–7% |
| MgO + ZnO + PbO | 0.5–5.5% |
| in which | |
| MgO | 0.5–5.5% |
| ZnO | 0–5% |
| PbO | 0–5% |
| $P_2O_5$ | 1–4% |
| $Al_2O_3$ | 0–7% |
| $As_2O_3 + Sb_2O_3$ | 0–2% | said glass-ceramic containing lithium disilicate ($Li_2O.2SiO_2$) and alpha-quartz ($SiO_2$) as a main crystal phase.

The above described content ranges of the respective ingredients have been selected for the reasons stated below.

The $SiO_2$ ingredient is an important ingredient which produces crystals of lithium disilicate ($Li_2O.2SiO_2$) and alpha-quarts ($SiO_2$) as a main crystal phase by heat treating the base glass. If the amount of this ingredient is below the crystal produced in the glass-ceramic is instable and its texture tends to become too rough. If the amount of this ingredient exceeds 83%, difficulty arises in melting the base glass.

The $Li_2O$ ingredient is also an important ingredient which produces lithium disilicate ($Li_2O.2SiO_2$) crystal as a main crystal phase by heat treating the base glass. If the amount of this ingredient is below 8%, growth of this crystal becomes difficult and melting of the base glass becomes also difficult. If the amount of this ingredient exceeds 13%, the grown crystal of the glass-ceramic becomes instable and its texture tends to become too rough and, besides, chemical durability and hardness of the glass-ceramic are deteriorated. For increasing sufficiently high hardness and high thermal expansion characteristics of the glass-ceramic product (a magnetic disk substrate) and obtaining a further fine crystal grain, the amount of this ingredient should preferably be within the range of 8–12%.

The $K_2O$ ingredient is an ingredient which improves melting property of the base glass and can be included up to 7%, preferably within the range of 1–6%.

The MgO ingredient is an important ingredient which has been found in this glass-ceramic to cause a crystal grain of alpha-quartz ($SiO_2$) as the main crystal phase to grow randomly in the entire secondary grain structure. If the amount of this ingredient is below 0.5%, the above described effect cannot be obtained whereas if the amount of this ingredient exceeds 5.5%, growth of a desired crystal becomes difficult.

The ZnO and PbO ingredients may also be added because they have a function similar to that of MgO. If the amount of the ZnO and PbO ingredient exceeds 5%, growth of a desired crystal becomes difficult.

For the same reason, the total amount of the MgO, ZnO and PbO, ingredients should be within the range from 0.5 to 5.5%.

The $P_2O_5$ ingredient is an essential ingredient as nucleating agent for the glass-ceramic. If the amount of this ingredient is below 1%, a desired crystal cannot be produced whereas if the amount of this ingredient exceeds 4%, the grown crystal of the glass-ceramic becomes instable and too rough.

The $Al_2O_3$ ingredient is an effective ingredient for improving chemical durability of the glass-ceramic. If the amount of this ingredient exceeds 7%, the melting property of the base glass is deteriorated and, as a result, the rate of crystal growth of alpha-quartz ($SiO_2$) as the main crystal phase phase is reduced. This ingredient should preferably be added in the amount of 1–8%.

The $As_2O_3$ and $Sb_2O_3$ ingredients may be added as refining agents in melting the base glass. It will suffice if the total amount of one or both of these ingredients up to 2% is added to the glass.

For manufacturing the colored glass-ceramic of the above described composition for magnetic disks, the base glass having the above composition including the coloring agent is melted and after being subjected to heat forming and/or cold forming, is heat treated for crystallization under a temperature of 900° C. or below. By this processing, a colored glass-ceramic containing lithium disilicate ($Li_2O.2SiO_2$) and alpha-quartz ($SiO_2$) as a main crystal phase and having Munsell lightness within the range of 0–7 in the CIE color system is produced. For using this glass-ceramic as a magnetic disk substrate, the glass-ceramic thus heat treated is then subjected to the lapping process and finally polishing process and the surface roughness (Ra) after final polishing comes within the range from 15 Å to 50 Å.

The above described colored glass-ceramic has the Munsell lightness of 0–7 and so a defect on the surface of the glass-ceramic can be detected easily. Besides, this glass-ceramic, the grown crystal grain (secondary grain) of alpha-quartz has a globular grain structure which enables control of the grain size by heat treatment and acheivement of a desired surface roughness of the polished surface whereby the glass-ceramic can be utilized as an excellent magnetic disk substrate.

EXAMPLES

Examples of the colored glass-ceramic for magnetic disks used in the method according to the invention will now be described. Tables 1 and 2 show compositions of respective ingredients of examples (Nos. 1 to 6) of the colored glass-ceramic used in carrying out the method according to the invention and Table 3 shows compositions of respective ingredients of comparative examples of the prior art $SiO_2$—$Li_2O$ system glass-ceramic together with the colors, rate of reflection, Munsell value, easiness for detecting a defect by visual checking and type of a main crystal phase.

The crystallizing conditions of the respective examples and comparative examples are as follows:

(1) Nucleating Condition (temperature×time)

Examples Nos. 1 to 6: 540° C.×5 hrs.

Comparative examples: 540° C.×5 hrs.

(2) Crystallizing Condition (temperature×time)

Examples Nos. 1 to 6: 740° C.×2 hrs.

Comparative examples: 740° C.×2 hrs.

The glass-ceramics of Examples Nos. 1 to 6 contains 0.5–5 weight percent of at least one ingredient selected from the metal oxides including $V_2O$, CuO, $MnO_2$, $Cr_2O_3$, CoO, $MoO_2$, NiO, $Fe_2O_3$, $TeO_2$, $CeO_2$, $Pr_2O_3$, $Nd_2O_3$, $Er_2O_3$ and, by containing this ingredient, the Munsell lightness of the glass-ceramic is set within the range of 1–7.

In Tables 1 to 4, $Li_2Si_2O_5$ described in the column of the main crystal phase represents lithium disilicate ($Li_2O.2SiO_2$). The symbol ⊙ in the column of "defect detection" denotes that detection is very easy, and the symbol X denotes that detection is difficult.

As will be apparent from Tables 1 to 2, the glass-ceramics of Examples Nos. 1 to 6 contain the coloring agent or agents and thereby exhibit a predetermined color and have Munsell value within the range of 1–7 and a defect on the surface of the glass-ceramic can be detected easily. It will also be understood that the glass-ceramics of the comparative examples which do not contain any coloring agent is opaque or transparent and their Munsell value is 9 or undisplayable with the result that detection of a defect is difficult.

TABLE 1

| Examples | 1 | 2 | 3 |
|---|---|---|---|
| $SiO_2$ | 75.8 | 75.8 | 75.8 |
| $Al_2O_3$ | 3.8 | 3.8 | 3.8 |
| $P_2O_5$ | 2.0 | 2.0 | 2.0 |
| MgO | 2.5 | 2.5 | 2.5 |
| ZnO | 0.5 | 0.5 | 0.5 |
| $Li_2O$ | 10.4 | 10.4 | 10.4 |
| $K_2O$ | 4.0 | 4.0 | 4.0 |
| $As_2O_3$ | 0.5 | 0.5 | 0.5 |
| | CoO 0.5 | NiO 0.5 | $Fe_2O_3$ 0.5 |
| Appearance (Color) | Blue | White Green | Brown |
| Rate of reflection R ($\lambda$ = 633 nm) | 4.2 | 4.4 | 4.3 |
| Munsell value (CIE) | 3 | 7 | 5 |
| Defect detection | ⊙ | ⊙ | ⊙ |
| Main crystal phase | $Li_2Si_2O_5$ α-quartz | $Li_2Si_2O_5$ α-quartz | $Li_2Si_2O_5$ α-quartz |

TABLE 2

| Examples | 4 | 5 | 6 |
|---|---|---|---|
| $SiO_2$ | 74.0 | 75.0 | 74.0 |
| $Al_2O_3$ | 4.0 | 4.0 | 4.0 |
| $P_2O_5$ | 2.0 | 2.0 | 2.0 |
| MgO | 2.5 | 2.5 | 2.5 |
| ZnO | 0.5 | 0.5 | 0.5 |
| $Li_2O$ | 10.5 | 10.5 | 10.5 |
| $K_2O$ | 4.0 | 4.0 | 4.0 |
| $As_2O_3$ | 0.5 | 0.5 | 0.5 |
| | $V_2O_5$ 0.5 $MnO_2$ 0.5 CuO 0.5 $Cr_2O_3$ 0.5 | $Cr_2O_3$ 1.0 | $V_2O_5$ 2.0 |
| Appearance (Color) | Black | Green | Yellowish Brown |
| Rate of reflection R ($\lambda$ = 633 nm) | 4.2 | 4.5 | 4.6 |
| Munsell value (CIE) | 1 | 5 | 6 |
| Defect detection | ⊙ | ⊙ | ⊙ |
| Main crystal phase | $Li_2Si_2O_5$ α-quartz | $Li_2Si_2O_5$ α-quartz | $Li_2Si_2O_5$ α-quartz |

TABLE 3

| | Comparative | Examples |
|---|---|---|
| $SiO_2$ | 72.1 | 72.0 |
| $Al_2O_3$ | 9.6 | 2.0 |
| $P_2O_5$ | 1.9 | |
| MgO | 1.0 | 2.5 |
| ZnO | 1.0 | |
| CaO | 0.4 | 9.0 |
| BaO | SrO 0.4 | |
| $Li_2O$ | 12.0 | |
| $K_2O$ | 1.1 | $Na_2O$ 14.5 |
| $TiO_2$ | | |
| $ZrO_2$ | | |
| $As_2O_3$ | 0.5 | |
| Appearance (Color) | White | |
| Rate of reflection R ($\lambda$ = 633 nm) | 5.0 | 10.0 |
| Munsell value (CIE) | 9 | |
| Defect detection | X | X |
| Main crystal phase | $Li_2Si_2O_5$ α-cristobalite | |

Detection of a defect on the surface of the glass-ceramic for magnetic disk of the above described Example 1 by using an automatic checking device will now be described.

An automatic disk surface checking device RS-1310 with a microscope manufactured by Hitachi Denshi Engineering Co. Ltd. was used for checking of a defect on a substrate for a magnetic disk made of the glass-ceramic of Example 1. In this device, a laser beam projected from a He—Ne laser beam source (output value: 10 mV) is focused as a spot (having an area of 565 μm², 12 μm the circumferential direction and 60 μm in the radial direction, wavelength being 633 nm) on the surface of the disk through a focusing lens. The device has a LIGHT beam receiving a unit which receives a reflected beam from the surface of a substrate and detects scratches and contaminations, a DARK beam receiving unit which receives diffused beam and detects particles on the surface and a direct reflection receiving unit which detects a pit and a distort. A received defect signal is converted to an electrical signal by a photo multiplier and a photo detector.

A noise level and a DC level of DARK received signal data obtained from a substrate for a magnetic disk made of a glass-ceramic which is of the same composition as Example 1 excepting that the former contains no coloring agent (hereinafter referred to as "DISK 1") are shown in Table 4 and a noise level of DARK received signal data obtained from the substrate for a magnetic disk made of the glass-ceramic of Example 1 (hereinaftre referred to as "DISK 2") is shown in Table 5. Simlarly, a noise level and a DC level of LIGHT received signal data obtained from the DISK 1 are shown in Table 6 and a noise level of LIGHT received signal data obtained from the DISK 2 is shown in Table 7.

TABLE 4

DARK received signal data from the DISK 1
(without color)
(before being subjected to a high-pass filter)

| | Voltage applied to photo mulitplier (V) | | | | | | | |
|---|---|---|---|---|---|---|---|---|
| | 300 | 350 | 400 | 450 | 500 | 550 | 600 | 650 | 700 |
| Noise (mV) | 10 | 10 | 10 | 15 | 15 | 20 | 50 | 75 | 150 |
| DC level (mV) | 0 | 0 | 8 | 20 | 45 | 90 | 190 | 380 | 760 |

TABLE 5

DARK received signal from DISK 2
(with color, Example 1)
(after being subjected to a high-pass filter)

| | Voltage applied to photo multiplier (V) | | | | | | | |
|---|---|---|---|---|---|---|---|---|
| | 300 | 350 | 400 | 450 | 500 | 550 | 600 | 650 | 700 |
| Noise (mV) | — | — | — | — | 5 | 5 | 10 | 18 | 25 |

TABLE 6

LIGHT received signal data from DISK 1
(without color)
(before being subjected to a high-pass filter)

| | Voltage applied to photo multiplier (V) | | | |
|---|---|---|---|---|
| | 250 | 300 | 350 | 400 |
| Noise (mV) | 10 | 10 | 30 | 80 |
| DC level (mV) | 0 | 0 | 0 | 0 |

TABLE 7

LIGHT received signal data from DISK 2
(with color, Example 1)
(after being subjected to a high-pass filter)

| | Voltage applied to photo multiplier (V) | | | |
|---|---|---|---|---|
| | 300 | 350 | 400 | 450 |
| Noise (mV) | 5 | 10 | 50 | — |

It will be understood from Table 4 that as the voltage applied to the photo multiplier exceeds 450 V, influence of the diffused light from the surface of the glass-ceramic containing no coloring agent becomes strong with resulting increase in the DC component (mV) in the background level. This state is not desirable from the standpoint of detecting a weak light signal generated from a defect on the surface of the sustrate. Setting the voltage applied to the photo multiplier at a preferred value of 500 V, it has been found that the value of noise in the substrate of the glass-ceramic containing no coloring agent is significantly larger than the value of noise in the substrate of the glass-ceramic of Example 1. This indicates that it is much easier to detect a defect by using the automatic checking device in the substrate of the glass-ceramic of Example 1 than in the substrate of the glass-ceramic containing no coloring agent.

In Table 7 also, it is found that the value of noise is significantly smaller in the substrte of the glass of Example 1 than in the substrate of the glass-ceramic containing no coloring agent, though the difference is not so remarkable as in the DARK receiced signal data.

In the above described example in which He—Ne laser (wavelength: 633 nm) is used, a colored glass-ceramic of a cyan type shows little noise and therefore easy for detection of a defect. Likewise, when a green light source is used, a glass-ceramic of a magenta type is preferable and when a blue light source is used, a glass-ceramic of a dark yellowish color is preferable. When a light source which is near a neutral light such as a halogen lamp light is used, a glass-ceramic of a dark color having a low Munsell lightness is favourable for detecting a defect on the surface.

What is claimed is:

1. A method for detecting a defect in a glass-ceramic for magnetic disks comprising steps of:

forming a colored glass-ceramic containing lithium disilicate ($Li_2O.2SiO_2$) and alpha-quartz ($SiO_2$) as the main crystal phases said glass-ceramic having a Munsell value within the range of 0 to 7 in the CIE color system, by subjecting to heat treatment a base glass comprising in weight percent:

| | |
|---|---|
| $SiO_2$ | 65–83% |
| $Li_2O$ | 8–13% |
| $K_2O$ | 0–7% |
| $MgO + ZnO + PbO$ | 0.5–5.5% |
| in which | |
| $MgO$ | 0–5% |
| $ZnO$ | 0–5% |
| $PbO$ | 0–5% |
| $P_2O_5$ | 1–4% |
| $Al_2O_3$ | 0–7% |
| $As_2O_3 + Sb_2O_3$ | 0–2% |
| a coloring agent of at least one ingredient selected from the group consisting of metal oxides of V, Cu, Mn, Cr, Co, Mo, Ni, Fe, Te, Ce, Pr, Nd and Er | 0.5–5%; | and inspecting the glass-ceramic visually or by means of an automatic detecting device to detect the difference which is produced by reflected or diffused light by a defect on the surface of said glass-ceramic and a normal surface portion of said glass-ceramic in order to detect a defect in the glass-ceramic.

2. A method as defined in claim 1 wherein the inspection is carried out visually.

3. A method as defined in claim 1 wherein the inspection is carried out by means of an automatic detecting device.

4. A method as defined in claim 1 wherein the coloring agent is at least one ingredient selected from the group consisting of metal oxides of V, Mn, Cr, Co, Mo, Ni, Fe, Te, Ce, Pr, Nd and Er.

* * * * *